United States Patent [19]

Moore

[11] Patent Number: 5,374,294
[45] Date of Patent: Dec. 20, 1994

[54] CONTROLLED RELEASE POTASSIUM DIVALENT METAL PHOSPHATE FERTILIZER

[75] Inventor: William P. Moore, Hopewell, Va.

[73] Assignee: The Vigoro Corporation, Chicago, Ill.

[21] Appl. No.: 64,718

[22] Filed: May 19, 1993

[51] Int. Cl.$^5$ ............ C01B 25/45; C05B 9/00
[52] U.S. Cl. ............................ 71/41; 71/46; 71/51; 423/306
[58] Field of Search ............ 71/1, 33, 34, 36, 41, 71/46, 51; 423/306, 309, 312, 313

[56] References Cited

U.S. PATENT DOCUMENTS

| | | | |
|---|---|---|---|
| 3,285,731 | 11/1966 | Salutsky et al. | 71/33 |
| 3,585,020 | 6/1971 | Legal et al. | 71/29 |
| 4,217,333 | 8/1980 | Loblich et al. | 423/306 |
| 5,035,872 | 7/1991 | Loblich et al. | 423/306 |

FOREIGN PATENT DOCUMENTS

| | | | |
|---|---|---|---|
| 165183 | 3/1952 | Australia | 71/1 |
| 46-24047 | 7/1971 | Japan . | |

OTHER PUBLICATIONS

Bassett and Bedwell, "Studies of Phosphates–I", Journ. Chem. Soc. (London) 1933, pp. 854–871.
Rothbaum, New Zealand Journ. of Science, 1973, pp. 539–552.

*Primary Examiner*—Ferris Lander

[57] ABSTRACT

A controlled slow release potassium divalent metal phosphate composition for agriculture and an effective method of preparing the composition. The cold water insolubilities of each of the contained nutrients are between 35 and 98 percent. The potassium exhibits an Activity Index between 20 and 85. The release of all contained nutrients is substantially complete in one growing season without damage to plant foliage or roots. Divalent metals effectively forming the new composition include magnesium, manganese, zinc, iron, cobalt, and copper. The effective method of preparing the new composition requires the exothermic coreaction of concentrated potassium hydroxide, divalent metal oxide powder, and concentrated phosphoric acid, with a molecular ratio of 1 potassium/1 divalent metal/1 phosphate with the total water content of the initial reaction mixture between 20 and 50 percent, at a maximum temperature between 85° and 150° C., until damp dry, particulate, water insoluble potassium divalent metal phosphate is formed.

13 Claims, No Drawings

CONTROLLED RELEASE POTASSIUM DIVALENT METAL PHOSPHATE FERTILIZER

BACKGROUND OF THE INVENTION

1. Field of the Invention

The present invention relates to agricultural mineral nutrients and methods for their preparation. More particularly this invention is directed to a new controlled slow releasing potassium divalent metal phosphate nutrient composition. This invention provides a new and effective method of preparing the new composition in the form of hard granules from caustic potassium, divalent metal oxide powders, and acid phosphates.

2. Description of the Prior Art

Potassium is one of the three plant macronutrients. Like nitrogen, moderate amounts of potassium can cause foliage and root burns on plants. Because of the high water solubilities of most potassium salts used as plant nutrients, much of the potassium supplied as fertilizer is lost to leaching by rain or irrigation water.

Conversely, potassium is fixed so strongly in some water insoluble compounds that it does not solubilize, decompose, or release at rates fast enough to allow appreciable assimilation by plants even in a full growing season. Potassium metaphosphate, potassium aluminum silicate, and the naturally occurring micas are examples of potassium compounds which supply little potassium for assimilation as a plant nutrient in a single growing season.

There has been no success reported in the prior art in preparing controlled slow release potassium plant nutrients by chemical reaction of soluble potassium compounds. The current state of the art requires sulfur or resin coating of soluble potassium salts to provide controlled slow release plant nutrient.

The compound potassium magnesium phosphate in the prior art has been reported as source of water insoluble potassium. Some prior art sources also report potassium magnesium phosphate as water soluble potassium. The prior art has reported the water insolubility of similar compounds wherein the magnesium moiety was substituted for by manganous, ferrous, cupric, cobaltous, and zinc moieties.

Bassett and Bedwell, described the early preparation of potassium metal phosphates in "Studies of Phosphates—I," Journ. Chem. Soc. (London) 1933, 854–871. They reacted aqueous soluble divalent metal salts with a large stoichiometric excess of dipotassium phosphate and dried the resulting product.

In U.S. Pat. No. 3,285,731, Salutsky et al disclosed the preparation of complete particulate solid fertilizers which were long lasting and non-burning and consisted essentially of magnesium ammonium phosphate blended with between 1 and 99 percent potassium magnesium phosphate, and taught that potassium requirements of plants could be supplied over a long period of time without burning by potassium magnesium phosphate. The magnesium ammonium phosphate and potassium could be commingled and granulated or could be coprecipitated to form the mixture of the two compounds which was found to be necessary for the successful functioning of the Salutsky composition. They found that the higher the ratio of magnesium potassium phosphate, the more controlled was the release of nitrogen, and that the release of potassium was controlled by the amount of magnesium ammonium phosphate contained.

A free flowing granular, non-burning, non-crumbling fertilizer composition, consisting essentially of 55.5–69 percent coprecipitated and cogranulated magnesium ammonium phosphate, 6–8 percent magnesium potassium phosphate, 5–8 percent monoammonium phosphate, 13–20 percent monopotassium phosphate, 4–6 percent magnesium hydroxide, and 0.9–1.8 percent urea, was disclosed by C. C. Legal et al in U.S. Pat. No. 3,585,020. The product was prepared by mixing aqueous urea and ammonia, aqueous magnesium hydroxide slurry and blending in a Pugmill with aqueous phosphoric acid, aqueous potassium hydroxide, water and recycled solids with water concentration maintained between 25 and 35 percent by weight. The wet fertilizer granules withdrawn from the Pugmill were then dried with air at a high temperature between 460° and 650° F.

In Japanese Patent SHO 46-24047, A. Akiyama et al produced a fertilizer by reaction and precipitation of magnesium hydroxide, ammonium phosphate, and potassium compounds and obtained largely water insoluble nitrogen and water soluble potassium products.

Rothbaum reported in the New Zealand Journal of Science, 1973, Vol 16, 539–552, the preparation of potassium magnesium phosphate hexahydrate by a precipitation method of reacting potassium hydroxide with magnesium phosphate, which was derived in fair yield from disodium phosphate and magnesium sulfate.

From a survey of the prior art, it may be seen that potassium divalent metal phosphates have been known for many years, and that the compounds contain the two nutrients most needed with slow controlled release properties for fertilizers. However, to this date no quantitative control of the release of potassium, phosphorous, and divalent metals has been achieved. Therefore no commercialization has been made of this material which offers great promise in the field of agricultural nutrients.

The prior art has supplied no teachings regarding quantitative control of the nutrients potassium, divalent metals, and phosphate from a single compound and has reported generally slow release of potassium, only from plant food mixtures, particularly from potassium magnesium phosphate admixed with magnesium ammonium phosphate.

The preparation methods for the potassium divalent metal phosphates utilized in the prior art consisted of precipitation from aqueous solution or reaction in the form of a thick mass of solids and liquids including substantial recycle of solids in a Pugmill, followed by granulation in a rolling bed.

Although the prior art cited above discloses water insoluble phosphate and divalent metal nutrients, no teachings are made of compositions in which these nutrients are water insoluble, yet controlled slow releasing. Also not reported are the properties which a composition must possess to exhibit the desired controlled slow and complete release of these nutrients. The prior art has taught no methods for preparing these new compositions.

The prior art provides analytical methods for defining slow and controlled release nitrogen concentrations and for nitrogen Activity Indices. Official methods provided in the Official Methods of Analysis, 15th Edition, of the Association of Official Analytical Chemists, Volume 1, relating to this disclosure are listed as follows: 945.01 Nitrogen (Water Insoluble), 955.05 Nitrogen Activity Index, 955.04C Nitrogen (Total), and 983.02 Potassium (Total). No official methods have been provided for the determination of water insoluble potassium and potassium activity index.

For determining Cold Water Insoluble Potassium (CWIK), Hot Water Insoluble Potassium (HWIK), and Potassium Activity Index (KAI) in this disclosure, the nitrogen system was adapted for use with potassium. In this adapted procedure, total potassium was determined by Method 983.02, and the CWIK by 945.01, except that potassium was determined instead of nitrogen. HWIK and KAI were determined by the procedures of Method 955.05, except that potassium was analyzed instead of nitrogen. The Activity Index is sometimes referred to as Availability Index and is indicative of the availability of the water insoluble nutrient to a crop in a growing season. A 100 index indicates complete availability of the cold water insoluble nutrient in one growing season, and a 0 index indicates no availability in one season.

Prior art has provided in the above mentioned Edition Method 958.01 for determining total phosphorous, Method 970.01 for water soluble phosphorous, and 963.03 for citrate insoluble and soluble phosphorous. Citrate solubility is indicative of phosphate availability in the soil.

Official Method 965.09 provides a method of determining minor nutrients in fertilizers and specifically the divalent metals calcium, copper, iron, magnesium, manganese, zinc, and cobalt. Availabilities in the soil of these metals may be determined by measurement of the solubility of the metals in ethylenediaminetetraacetic acid (EDTA).

OBJECTS OF THE INVENTION

A primary object of this invention is to provide particulate controlled slow release potassium plant nutrient composition which causes no damages to plant foliage or roots when applied at high rates but releases its potassium nutrient throughout one growing season.

A further primary object of this invention is to provide a granular controlled slow release potassium divalent metal phosphate composition comprising water insoluble plant nutrients potassium, divalent metals, and phosphorous which are released in one growing season.

A further primary object of this invention is to provide an effective method of preparing a water insoluble potassium divalent metal phosphate composition which effectively releases its agricultural nutrient contents in a controlled slow manner.

SUMMARY OF THE INVENTION

A new solid, particulate potassium divalent metal phosphate agricultural nutrient composition has been discovered which safely, slowly, and effectively releases its nutrients in a controlled manner, comprising potassium, divalent metal, and phosphate moieties in about a 1/1/1 molecular ratio with between 35 and 98 percent of each of its nutrient components insoluble in cold water. Other properties found essential to the effective composition include: an Activity Index (KAI) between 20 and 85 for the cold water insoluble potassium, a neutral ammonium citrate solubility for the phosphate between 35 and 85 percent, and a solubility in aqueous ethylenediaminetetraacetic acid for the divalent metal nutrient between 35 and 98 percent. Only when the composition was within the above parameters did it provide controlled slow release of its nutrient components in a single season.

It was discovered that the new particulate agricultural nutrient composition could be effectively prepared by a new method from a homogeneous liquid comprising divalent metal oxide power, concentrated aqueous caustic potassium, and concentrated aqueous acid phosphate, which with intensive mixing, quickly reacts exothermically to form homogeneous damp-dry solid particles of water insoluble potassium divalent metal phosphate at a temperature near to, or higher than, the boiling point of water. To best form a potassium divalent metal phosphate exhibiting the nutrient water insolubilities indicative of, and requisite for, quantitative controlled slow release, and release in a single growing season, it is necessary to perform the method under the following closely controlled operating parameters: a molecular ratio of potassium/divalent metal/phosphate of about 1/1/1, with the divalent metal supplied as powdered solids, the potassium as concentrated aqueous caustic potassium, and the phosphate supplied as concentrated aqueous acid phosphate. It is necessary that the initial reaction mixture contain between about 25 and 50 percent by weight water and that a maximum reaction temperature of between 85° and 150° C. be reached during a reaction-solidification time amounting to between 3 and 30 minutes, to provide a final product exhibiting a pH between 6 and 8.

DETAILED DESCRIPTION OF THE INVENTION

A new homogeneous particulate solid potassium divalent metal composition has now been discovered which provides controlled slow release of its components as effective nutrients for agriculture. The effective composition comprises potassium, divalent metal, and phosphate moieties combined in a molecular ratio of about 1/1/1, respectively.

The cold water insolubility of each nutrient amounts to between 35 and 98 percent, the cold water insoluble potassium (CWIK) has an Activity Index (KAI) between about 20 and 85, the phosphate exhibits a neutral ammonium citrate solubility between 35 and 85 percent, and the divalent metal exhibits a solubility in aqueous ethylenediamine tetraacetic acid between 35 and 98 percent in the effective composition. The composition provides agricultural nutrients effective for plants.

Divalent metals, those metals having a positive valence of two and reacting on ratio with two negative valences, are the only metals suitable for the present composition. Those metals which are particularly effective in the composition are magnesium, manganese, iron, copper, cobalt, and zinc.

The preferred plant nutrient composition is a hard granular potassium divalent metal phosphate which provides controlled slow and substantially complete release of its nutrients in one growing season. This composition contains nutrients, potassium, divalent metal, and phosphate in a molecular ratio closely controlled to 1/1/1. In the preferred composition, the cold water solubility of each nutrient is between 45 and 85 percent, the KAI of the cold water insoluble potassium is between 45 and 85, the neutral ammonium citrate solubility of the phosphate is between 60 and 85 percent, and the solubility of the divalent metal in aqueous ethylenediamine tetraacetic acid is between 60 and 95 percent. In this plant nutrient composition, the preferred divalent metals are magnesium, manganese, iron, copper, and zinc.

A practical method was discovered for the effective preparation of the solid particulate agricultural nutrient composition from a homogeneous liquid. In this method a divalent metal oxide powder, aqueous caustic potassium, and aqueous acid phosphate moieties in a respective molar ratio of about 1/1/1 are admixed to form a homogeneous liquid initially containing between 20 and 50 percent water. While intensively mixing the homogeneous liquid, the aqueous moieties are reacted exothermically until a maximum reaction temperature between 85° and 150° C. is reached. The reaction is continued with intensive mixing while moisture is evaporated from the homogenous liquid for between 3 and 30 minutes until damp dry, water insoluble potassium divalent metal phosphate particles are formed which have a near-neutral pH of between 6 and 8 and cold water insolubilities of each nutrient between 35 and 95 percent.

The method is operated preferably with the divalent metal oxide powder comprising particles with diameters smaller than 0.5 millimeter. Although the method operates most effectively with dry metal oxide powders, it is possible to successfully operate the method where the oxide powders are hydrated to their hydroxide form prior to reaction.

Although several aqueous caustic potassium sources such as basic potassium phosphates or potassium carbonates may be used in the instant method, the preferred aqueous caustic potassium source is liquid potassium hydroxide at a concentration between 40 and 60 percent.

In a similar manner, several aqueous acid phosphates may be used in the present method, such as potassium acid phosphate, and concentrated liquid phosphoric acids containing between 40 and 75 percent $P_2O_5$. The phosphoric acids selected may be green or black wet process acids or white furnace acid. Either ortho-, pyro-, or poly- phosphoric acid may be used effectively in the method. Commercial superphosphoric acid containing a combination of ortho-, pyro-, and polyphosphoric acids is particularly effective when its $P_2O_5$ concentration is between 58 and 80 percent.

The composition of the homogenous liquid formed is an important aspect of the present method, and an initial water concentration between 22 and 35 percent is important. When water concentrations are lower than 22 percent, reaction is incomplete and water insolubilities, particularly of the potassium component, are lower than required in the new composition. When water concentrations are higher than 35 percent, the exothermic heat of reaction is insufficient to evaporate sufficient water to form the particulate damp dry solids required and the reaction mixture reams in a liquid or a viscous semisolid without application of external heat.

The reaction is continued while moisture is evaporated preferably for between 7 and 15 minutes until damp dry water insoluble potassium divalent metal phosphate particles are formed which contain between 8 and 18 percent water, and provide particles with optimum physical integrity, particularly resistance to crushing and abrasion.

When the moisture of the damp dry particles is outside the desired final moisture content, the particles may be dried further in an additional drying step to reduce moisture concentration to between 1 and 8 percent to provide maximum nutrient concentrations without reducing the physical integrity of the particles.

To prepare a composition of hard granules of potassium divalent metal phosphate fertilizer which is resistant to attrition and provides controlled slow and complete release of its plant nutrients, close control must be exercised over the operating parameters of the instant method. To form the homogenous liquid initially containing potassium, divalent metal, and phosphate in a molecular ratio of 1/1/1 and water amounting to between 22 and 35 percent, it is preferred to admix divalent metal oxide powder particles with diameters smaller than 0.5 millimeters, concentrated aqueous caustic potassium containing between 42 and 50 percent potassium hydroxide, and a concentrated phosphoric acid solution containing between 48 and 63 percent $P_2O_5$. The mixing is followed by exothermically reacting at a maximum reaction temperature between 115° and 135° C. while intensively mixing in an enclosed inclined pan, rotating at a rim speed between 0.5 and 3.0 meters per second around a center slightly inclined from vertical, which carries its contents toward a scraper, which in turn deflects the contents toward a high speed rotor, which applies thereto a strong shear force and homogenization to the contents at a tip speed between 5.0 and 50 meters per second. The exothermic reaction is continued with intensive mixing while moisture is evaporated from the homogeneous liquid for between 7 and 15 minutes until hard, damp dry, water insoluble potassium divalent metal phosphate granules are formed which exhibit a near neutral pH of between 6.5 and 7.5.

To decrease the water content of these hard damp dry granules, a step is added to the method wherein, they are dried in an additional fluid bed dryer operating with a hot fluidizing air temperature of between 100° and 250° C. until the water content of the granules is decreased to between 1 and 8 percent. It is possible to obtain moistures almost as low as 8 percent directly out of the pan and moistures lower than 1 percent cause decreased resistance to crushing and increased handling attrition.

The homogeneous hard granules of potassium divalent metal phosphate fertilizer composition prepared by the instant method provide storate stability, attrition resistance, and controlled slow and complete release of nutrients heretofore unavailable from other potassium fertilizers.

The method of this invention is effective primarily for the preparation of pure or agricultural grade potassium divalent metal phosphate and is not particularly effective when the potassium moiety is present in appreciably higher molar amounts than the divalent metal and phosphate moieties. However, the method may be effectively used to prepare a controlled slow release granular matrix fertilizer when the fertilizer contains between 0 and 80 percent additional plant nutrients homogeneously included in a matrix of potassium divalent metal phosphate.

In this aspect of the method, divalent metal oxide powder particles with diameters smaller than 0.5 millimeters, aqueous potassium hydroxide at a concentration between 42 and 50 percent, phosphoric acid containing between 48 and 71 percent $P_2O_5$, and additional plant nutrient powder amounting to between 20 and 80 percent of the final matrix fertilizer are mixed, so that potassium, divalent metal, and phosphate are present in a 1/1/1 molar ratio and water concentration in the homogenous aqueous liquid formed is between 22 and 35 percent.

The potassium, divalent metal, and phosphate moieties in the homogeneous liquid and additional plant nutrient powder are exothermically reacted and the additional plant nutrients are substantially unreacted while intensive mixing continues at a maximum temperature between 115° and 135° C.

By continuing the exothermic reaction with intensive mixing while moisture is evaporated from the homogeneous liquid for between 7 and 20 minutes until water insoluble potassium divalent metal phosphate is formed, the additional plant nutrient powder are homogeneously included in damp dry controlled release plant nutrient granules.

The homogeneous matrix fertilizer composition granules prepared by the instant method are hard and resistant to attrition and surprisingly release the additional nutrients included in the matrix at a controlled rate so long as the additional nutrients amount to between 20 and 80 percent of the composition. The rate of release of these added nutrients depends substantially on the amount added, with release rate increasing as the amount of added nutrients increases.

Plant nutrients which may be effectively included as part of the composition of this invention include isobutylidene diurea, methylene urea, crotylidene diurea, urea, methylolurea, ureaformaldehyde polymers, and ammonium sulfate.

MODE OF OPERATION OF THE INVENTION

Having described the basic concepts of the instant invention, reference is now made to the following examples which are provided to illustrate the efficacious homogeneous particulate solid potassium divalent metal phosphate composition for agriculture which provides controlled slow release of its component nutrients; and an effective method for its preparation.

EXAMPLE 1

This example illustrates the new composition by providing specific analyses and properties and relating them to the effectiveness of their agricultural nutrients.

A hard granular potassium divalent metal phosphate plant fertilizer composition was prepared from concentrated potassium hydroxide, manganous oxide powder, and concentrated black orthophosphoric acid, which contained potassium, the divalent metal manganese, and phosphate in a molecular ratio of about 1/1/1. The granules were analyzed by AOAC methods and the results are listed as follows:

| Component | Percent |
| --- | --- |
| Potassium, total as $K_2O$ | 15.3 |
| CWIK, portion of total K | 78.4 |
| KAI, activity index of CWIK | 46.7 |
| Manganese, total as Mn | 24.4 |
| Water solubility of Mn | 3.5 |
| EDTA solubility of Mn | 68.6 |
| Phosphate, total as $P_2O_5$ | 26.7 |
| Water solubility of $P_2O_5$ | 5.1 |
| Citrate solubility of $P_2O_5$ | 38.7 |

The nutrient release properties of the potassium manganese phosphate granules were determined by long term leach tests carried out by incorporating the fertilizer granules in pine bark-sand filled pots, such as those used to grow ornamental plants like azaleas. The pots were watered to maintain optimum growing conditions and then drenched each week with water amounting to twice the pot free volume. The leaches were recovered and analyzed for potassium content. The tests included for comparative evaluation sulfur coated potassium sulfate-urea granules and plastic coated 18-6-12-Osmocote 9 month product. The results are tabulated as follows:

| | PPM-K in Leachate | | |
| --- | --- | --- | --- |
| | | Osmocote 9 mo | |
| Product | $KMnPO_4$ | 18-6-12 | S-Coated $K_2SO_4$-Urea |
| After 1 week | 80 | 139 | 81 |
| After 2 weeks | 48 | 56 | 91 |
| After 4 weeks | 35 | 47 | 66 |
| After 6 weeks | 51 | 20 | 87 |
| After 11 weeks | 47 | 15 | 97 |
| After 20 weeks | 48 | 21 | 37 |
| After 31 weeks | 42 | 22 | 16 |

The pots were analyzed for retained potassium after 40 weeks, considered to be a long growing season. The potassium solubilization from the sulfur and plastic coated products were found to be complete with virtually none of the potassium remaining undissolved. The potassium remaining from the potassium magnesium phosphate after a growing season amounted to 4.6 percent of the original material. Manganese and phosphate recovered in the remaining pine-bark sand of the potassium manganese phosphate amounted to 12 and 7 percent, respectively, of the original amounts.

EXAMPLE 2

This example uses the widely accepted measurement of Osmolality as an indicator of scorching and phytotoxicity to plant roots and foliage by plant nutrients. Measurements were made of Osmolality as mmol/Kg on 3 percent $K_2O$ concentrations in water.

Tests were made by measuring the osmolalities of ground (−40 mesh) potassium metal phosphate samples and other commercial potassium and phosphate nutrient sources. The results are listed as follows:

| Material | Analysis | Osmolality mmol/Kg |
| --- | --- | --- |
| Potassium Magnesium Phosphate | 0-36-21-14 Mg CWIK 60, KAI 35 | 213 |
| Potassium Magnesium Phosphate | 0-38-22-14 Mg CWIK 46, KAI 52 | 342 |
| Potassium Magnesium Phosphate (insufficient CWIK) | 0-38-22-14 Mg CWIK 3, - | 1106 |
| Potassium Magnesium Phosphate-IBDU | 12-18-11-7 Mg | 441 |
| Potassium Nitrate | 13-0-46 | 3434 |
| Diammonium Phosphate | 18-46-0 | 2054 |

These data show that potassium magnesium phosphate gives an osmolality of 10 percent or less of potassium and phosphate salts normally used as fertilizer nutrients. The data also show that good use safety and low osmolalities are obtained when the potassium magnesium phosphate are combined in a matrix fertilizer with isobutylidene diurea (IBDU). Most importantly the data show that the safety of the fertilizers are increased and the osmolalities are decreased as the conversion of potassium to water insoluble (CWIK) increases. Where CWIN was low at 3, osmolality and burn potential of the product was high.

EXAMPLE 3

This example demonstrates a preferred embodiment of the method of the instant invention for preparing potassium divalent metal phosphate as hard granular fertilizer for controlled slow release as plant nutrients.

The device in which the preparation was performed consisted of an inclined vertical rotary steel pan 0.72 meters in diameter, 0.38 meters deep, with the pan rotating at an angle of 30° from vertical. The pan was equipped with a stationary wall scraper-deflector which deflected the contents of the pan toward a high speed rotor 0.35 meters in diameter located 6 centimeters above the bottom of the pan so that its tips pass 3 centimeters from the wall of the pan. The rotor consisted of a 7.5 centimeter diameter shaft with 7 steel bars 2 centimeters thick and 5 centimeters wide, protruding radially equi-spaced therefrom starting at the bottom of the shaft with each additional bar located 3 centimeters above the next lower bar.

To the pan were added 8.8 kilograms of magnesium oxide powder having particle diameters smaller than 0.1 millimeters and containing 57 percent magnesium, 15.0 kilograms of recycled dry solids from previous similar preparations comminuted to a powder having particle diameters smaller than 0.5 millimeters, 27.7 kilograms of concentrated aqueous potassium hydroxide containing 47 percent potassium hydroxide, and concentrated black phosphoric acid containing 53 percent $P_2O_5$, to provide potassium, magnesium, and phosphate at a molecular ratio of 1.00/1.07/1.06 in a homogeneous liquid containing 31.6 percent water. The potassium hydroxide and the phosphoric acid were added incrementally in small doses.

With constant operation of the intensively mixing device, the mixture was exothermically reacted in the homogeneous liquid until a maximum reaction temperature of 122° C. was reached. The reaction was continued with intensive mixing while moisture was evaporated from the homogeneous liquid for 6.5 minutes until damp dry, water insoluble potassium magnesium phosphate granules were formed.

The damp dry granules contained 13.5 percent moisture and pH was measured to be 7.0. These granules were then dried in a fluid bed dryer with hot fluidizing air at a temperature of 200° C. until the moisture of the granules was reduced to 6.6 percent.

The product granules were cooled and evaluated by physical and chemical means. The results are listed as follows:

| Physical Tests: | |
|---|---|
| Resistance to Crushing, 6–12 mesh particles, average-2.0 Kg pH, 10% aqueous slurry-7.0 | |
| Color, light tan | |
| Product Distribution | Percent |
| +6 mesh | 13.2 |
| −6 +16 | 59.4 |
| −16 mesh | 27.4 |
| Chemical Analyses | Percent |
| Potassium, total | 22.0 |
| CWIK, of total | 60.2 |
| KAI, of CWIK | 42.2 |
| Magnesium, total | 14.5 |
| Water soluble, of total | 12.4 |
| EDTA soluble, of total | 85.3 |
| Phosphate, total $P_2O_5$ | 36.7 |
| Water soluble of total | 5.1 |
| Citrate soluble of total | 62.5 |
| Moisture | 6.6 |

EXAMPLE 4

This example is provided to demonstrate the effectiveness of the method with the amphoteric divalent metal zinc and furnace grade phosphoric acid.

In the equipment described in Example 3, the homogeneous liquid was prepared from the components listed as follows:

| Components | Kilograms |
|---|---|
| Zinc oxide powder, 72 percent Zn | 20.8 |
| Furnace Grade Phosphoric Acid, 61 Percent $P_2O_5$ | 26.6 |
| Potassium Hydroxide, 47 percent KOH | 27.6 |
| Water | 10.0 |

The homogeneous liquid provided potassium, zinc, and phosphate at a molecular ratio of 1/1/1 with a water content of 33.6 percent. Exothermic reaction of the liquid provided a maximum temperature of 119° C. and was continued with intensive agitation while moisture was evaporated for 9.4 minutes until damp dry water insoluble potassium zinc phosphate granules were formed. These granules were dried from 21 percent to 2.2 percent moisture, and analyses made are listed as follows:

| Chemical Analysis | Percent |
|---|---|
| Potassium, total | 15.3 |
| CWIK, of total | 78.4 |
| KAI, of CWIK | 29.7 |
| Zinc, total | 24.4 |
| Water soluble, of total | 2.5 |
| EDTA soluble, of total | 57.7 |
| Phosphate, total $P_2O_5$ | 15.2 |
| Water soluble $P_2O_5$ | 11.1 |
| Citrate soluble $P_2O_5$ | 48.8 |
| Moisture | 2.2 |

EXAMPLE 5

This example demonstrates the effectiveness, controlled slow release, and safety of the composition of this invention as a plant nutrient source.

The product of Example 3 was applied to separate triplicated 6 foot by 6 foot plots of irrigated mature Tall Fescue grass at potassium rates of 3 pounds $K_2O$ per 1000 square feet. The nitrogen was supplied as IBDU (50%) and urea (50%). A single application was made to the plots and observations were made of Turf Quality for a period of a 12 week growing season. Turf Quality was rated 9 for hardy green, and 0 if brown, with numerical gradations for qualities between. The results are tabulated for the Example 3 granules and other particulate commercial potassium fertilizer materials as follows:

| | 32 Turf Quality Ratings | | |
|---|---|---|---|
| Weeks after Application | Example 3 Product | Potassium Chloride 0-0-62 | Potassium Sulfate 0-0-50 |
| 0 | 7.5 | 7.5 | 7.5 |
| 2 | 7.7 | 2.0 yellowing | 6.0 |
| 4 | 8.0 | 0.0 brown | 5.0 yellow |

-continued

| Weeks after Application | 32 Turf Quality Ratings | | |
|---|---|---|---|
| | Example 3 Product | Potassium Chloride 0-0-62 | Potassium Sulfate 0-0-50 |
| 6 | 8.1 | — | 6.0 yellow |
| 8 | 8.4 | — | 6.5 |
| 12 | 8.0 | — | 6.7 |

I claim:

1. A method of preparing particulate solid potassium divalent metal phosphate for agriculture which provides controlled, slow release of its agricultural nutrients, the divalent metal selected from the group consisting of magnesium, manganese, iron, zinc, copper or cobalt, or a combination thereof, the method comprising:

(a) admixing divalent metal oxide powder, aqueous caustic potassium, and aqueous acid phosphate moieties in a potassium/divalent metal/phosphate molar ratio of about 1/1/1 to form a homogeneous liquid initially containing water amounting to between 20 and 50 percent by weight;

(b) exothermically reacting the aqueous moieties in the homogeneous liquid while mixing until a maximum reaction temperature between 85° and 150° C. is reached;

(c) continuing the reaction while moisture is evaporated from the homogeneous liquid for between 3 and 30 minutes until damp dry, water insoluble potassium divalent metal phosphate particles are formed, exhibiting a pH between 6 and 8, and a water insolubility between 35 and 95 percent.

2. The method of claim 1 wherein the divalent metal oxide powder comprises particles exhibiting diameters smaller than 0.5 millimeter.

3. The method of claim 1 wherein the divalent metal oxide is hydrated to its hydroxide form prior to its reaction.

4. The method of claim 1 wherein the aqueous caustic potassium comprises liquid potassium hydroxide at a concentration between 40 and 60 percent.

5. The method of claim 1 wherein the aqueous acid phosphate comprises a concentrated liquid phosphoric acid exhibiting a $P_2O_5$ concentration between 40 and 75 percent.

6. The method of claim 1 wherein the aqueous acid phosphate is a concentrated phosphoric acid selected from the group consisting of: black wet process acid, green wet process acid, white furnace process acid, orthophosphoric acid, pyrophosphoric acid, and polyphosphoric acid.

7. The method of claim 1 wherein the aqueous acid phosphate is a superphosphoric acid exhibiting a $P_2O_5$ concentration between 58 and 80 percent.

8. The method of claim 1 wherein the homogeneous liquid formed initially contains between 22 and 35 percent water.

9. The method of claim 1 wherein the reaction is continued while moisture is evaporated from the homogeneous liquid for between 7 and 15 minutes until damp dry water insoluble potassium divalent metal phosphate particles are formed which contain between 8 and 18 percent water.

10. The method of claim 1 wherein the damp dry potassium divalent metal phosphate particles are dried further in an additional drying step to reduce water concentration of the particles to between 1 and 8 percent to provide maximum nutrient concentrations without reducing physical integrity of the particles.

11. A method of preparing homogeneous hard granules of a potassium divalent metal phosphate fertilizer composition which is resistant to attrition and provides controlled, slow and effective nutrient release, comprising:

(a) admixing divalent metal oxide, selected from group consisting of magnesium, manganese, iron, zinc, copper and cobalt oxides, powder particles exhibiting diameters smaller than 0.5 millimeter, concentrated aqueous liquid caustic potassium containing between 42 and 50 percent potassium hydroxide, and a concentrated phosphoric acid solution containing between 48 and 63 percent $P_2O_5$ to form a homogeneous liquid initially containing potassium, divalent metal, and phosphate in a molecular ratio of about 1/1/1 and water amounting to between 22 and 35 percent;

(b) exothermically reacting the aqueous moieties in the homogeneous liquid at a maximum reaction temperature between 115° and 135° C. while intensively mixing in an enclosed inclined pan, rotating at a rim speed between 0.5 and 3.0 meters per second around a center slightly inclined from vertical, which carries its contents toward a scraper, which in turn deflects the contents toward a high speed rotor, which applies a strong shear force at a tip speed between 5.0 and 50 meters per second and homogenization to the contents;

(c) continuing the reaction with intensive mixing while moisture is evaporated from the homogeneous liquid for between 5 and 15 minutes until hard damp dry water insoluble potassium divalent metal phosphate granules are formed which exhibit a near-neutral pH of between 6.5 and 7.5.

12. The method of claim 11 wherein the hard damp dry potassium divalent phosphate granules are dried in an additional fluid bed dryer operating with a hot fluidizing air temperature of between 100° and 250° C. until the water content of the granules is decreased to between 1 and 8 percent.

13. A method of preparing a controlled slow release granular matrix fertilizer icon raining between 20 and 80 percent additional plant nutrients homogeneously included in a matrix of potassium divalent metal phosphate, the divalent metal being selected from the group consisting of magnesium, manganese, iron, zinc, and copper, comprising:

(a) admixing divalent metal oxide powder particles exhibiting diameters smaller than 0.5 millimeters, aqueous potassium hydroxide at a concentration between 42 and 50 percent, phosphoric acid containing between 48 and 71 percent $P_2O_5$, and additional plant nutrient powder amounting to between 20 and 80 percent of the final matrix fertilizer to form a homogeneous liquid, initially containing potassium, divalent metal, and phosphate in a molecular ratio of 1/1/1 and water amounting to between 22 and 35 percent;

(b) exothermically reacting the aqueous potassium hydroxide, divalent metal oxide, and phosphoric acid in the homogeneous liquid containing the additional plant nutrient powder at a maximum reaction temperature between 115° and 135° C. while intensively mixing;

(c) continuing the reaction with intensive mixing while moisture is evaporated from the homogeneous liquid for between 7 and 20 minutes until water insoluble potassium divalent metal phosphate is formed homogeneously including the additional plant nutrient powder in damp dry controlled slow release plant nutrient granules.

* * * * *